(12) United States Patent
An et al.

(10) Patent No.: US 8,344,091 B2
(45) Date of Patent: Jan. 1, 2013

(54) POLYMER AND MEMBRANE-ELECTRODE ASSEMBLY FOR FUEL CELL, AND FUEL CELL SYSTEM INCLUDING THE SAME

(75) Inventors: Sung-Guk An, Suwon-si (KR); Sung-Yong Cho, Suwon-si (KR); Sang-Il Han, Suwon-si (KR); Kie Hyun Nam, Suwon-si (KR)

(73) Assignee: Samsung SDI Co. Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 686 days.

(21) Appl. No.: 12/453,395

(22) Filed: May 8, 2009

(65) Prior Publication Data

US 2009/0280384 A1    Nov. 12, 2009

(30) Foreign Application Priority Data

May 8, 2008    (KR) .................. 10-2008-0042912

(51) Int. Cl.
  *C08G 8/02*    (2006.01)
(52) U.S. Cl. ........ 528/125; 528/171; 528/295; 528/220; 528/373; 521/27; 429/479; 429/480; 429/498; 429/493; 429/429
(58) Field of Classification Search .................. 528/125, 528/171, 295, 220, 373; 521/27; 429/479, 429/480, 498, 493, 429
See application file for complete search history.

(56) References Cited

U.S. PATENT DOCUMENTS

| 7,211,203 | B2 | 5/2007 | Otsuki et |
| 7,504,461 | B2 | 3/2009 | Cao |
| 2006/0041100 | A1 | 2/2006 | Cao |
| 2009/0075147 | A1 | 3/2009 | Kitamura et al. |

FOREIGN PATENT DOCUMENTS

| CN | 1984940 A | 6/2007 |
| EP | 1450430 A2 | 6/2004 |
| EP | 1889863 A1 | 2/2008 |
| JP | 2003-012795 | 1/2003 |
| JP | 2003-292609 | 10/2003 |
| JP | 2004-256797 | 9/2004 |

(Continued)

OTHER PUBLICATIONS

Ind. Eng. Chem. Res. 2005, 44, 7617-7626, Lee et al.

(Continued)

*Primary Examiner* — Shane Fang
(74) *Attorney, Agent, or Firm* — Robert E. Bushnell, Esq.

(57) ABSTRACT

A polymer represented by the following Formula 1, and a membrane-electrode assembly and a fuel cell system including the polymer:

[Formula 1]

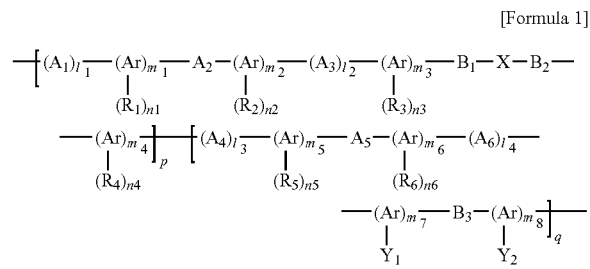

In the above Formula 1, definitions of the substituents are the same as in described in the detailed description.

19 Claims, 3 Drawing Sheets

FOREIGN PATENT DOCUMENTS

| | | |
|---|---|---|
| JP | 2005-222844 A | 8/2005 |
| JP | 2005-235524 A | 9/2005 |
| JP | 2006-342252 | 12/2006 |
| JP | 2007-528930 | 10/2007 |
| JP | 2007-294240 | 11/2007 |
| JP | 2008-038146 | 2/2008 |
| KR | 10-2007-0094675 | 9/2007 |
| WO | 2005/090439 A2 | 11/2005 |
| WO | 2007100342 A2 | 9/2007 |

OTHER PUBLICATIONS

Journal of Membrane Science 335 (2009) 13-20, Feng et al.
Journal of Power Source (2007), 167, 74-78, Han et al.
Macromol. Chem. Phys. 199, 1421-1426 (1998), Wang et al.
Korean Notice of decision to grant a patent issued by Korean Patent Office on May 19, 2010, corresponding Korean Patent Application No. 10-2008-0042912 and Request for Entry of the Accompanying Documents attached herewith.
The Japanese Office action issued by Japanese Patent Office on Aug. 23, 2011, corresponding to JP 2009-113695 and Request for Entry attached herewith.
Ind. Eng. Chem. Res. 2005, 44, 7617-7626 Cited in the Specification filed on May 8, 2009. p. 29, Lee et al.
Journal of Membrane Science 335 (2009) 13-20. Cited in the Specification filed on May 8, 2009. p. 29, Feng et al.
Journal of Power Source (2007), 167, 74-78. Cited in the Specification filed on May 8, 2009. p. 29, Han et al.
Macromol. Chem. Phys. 199, 1421-1426 (1998). Cited in Specification filed on May 8, 2009. p. 23-26, 28-29, Wang et al.
Extended European search report dated Oct. 15, 2009, of the corresponding European Patent Application No. 09159799.7.
Chinese Office action issued by Chinese Patent Office on Jun. 9, 2011, corresponding to Korean Patent Application No. 2008-0042912 and English translation is attached herewith.
OG page of Chinese Patent No. ZL200910138207.4 issued on Feb. 22, 2012, which also claims Korean Patent Application No. 10-2008-0042912 as its priority document.

POLYMER AND MEMBRANE-ELECTRODE ASSEMBLY FOR FUEL CELL, AND FUEL CELL SYSTEM INCLUDING THE SAME

CLAIM OF PRIORITY

This application makes reference to, incorporates the same herein, and claims all benefits accruing under 35 U.S.C.§119 from an application for POLYMER, MEMBRANE-ELECTRODE ASSEMBLY FOR FUEL CELL, AND FUEL CELL SYSTEM INCLUDING THE SAME earlier filed in the Korean Intellectual Property Office on 8 May 2008 and there duly assigned Serial No. 10-2008-0042912.

BACKGROUND OF THE INVENTION (a) Field of the Invention

The present invention relates to a polymer, and a membrane-electrode assembly for a fuel cell and a fuel cell system including the same. More particularly, the present invention relates to a polymer which may be used for a binder and a polymer electrolyte membrane, and a membrane-electrode assembly and a fuel cell system including the same.

(b) Description of the Related Art

A fuel cell is a power generation system for producing electrical energy through an electrochemical redox reaction of an oxidant and hydrogen included in a hydrocarbon-based material such as methanol, ethanol, or natural gas. Such a fuel cell is a clean energy source that may replace fossil fuels. It includes a stack composed of unit cells and produces various ranges of power output. Since it has four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell (DMFC) that uses methanol as a fuel.

The polymer electrolyte membrane fuel cell has an advantage of high energy density and high power, but also has problems in the need to carefully handle hydrogen gas and the requirement of accessory facilities such as a fuel reforming processor for reforming methane or methanol, natural gas, and the like in order to produce hydrogen as the fuel gas.

On the contrary, a direct oxidation fuel cell has a lower energy density than that of the polymer electrolyte fuel cell, but it has advantages of easy handling of a fuel, being capable of operating at room temperature due to its low operation temperature, and no need for additional fuel reforming processors.

In the above fuel cell, a stack that generates electricity substantially includes several to scores of unit cells stacked in multiple layers, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to the anode and adsorbed on catalysts of the anode, and the fuel is oxidized to produce protons and electrons. The electrons are transferred into the cathode via an external circuit, and the protons are transferred into the cathode through the polymer electrolyte membrane. In addition, an oxidant is supplied to the cathode, and then the oxidant, protons, and electrons are reacted on catalysts of the cathode to produce electricity along with water.

SUMMARY OF THE INVENTION

The present invention provides a novel polymer.

An aspect of the present invention provides a polymer having excellent ion conductivity, shape stability, and long-time stability.

Another An aspect of the present invention provides a membrane-electrode assembly for a fuel cell including the polymer.

Yet another An aspect of the present invention provides a fuel cell system including the membrane-electrode assembly.

According to an An aspect of the present invention, provided is a polymer represented by the following Formula 1.

[Chemical Formula 1]

[Chemical Formula 2]

In the above Formulae 1 and 2, $A_1$, $A_3$, $A_4$, $A_6$, $A_7$, and $A_8$ are independently selected from the group consisting of $CR_7R_8$, O, S, CO, SO, and $SO_2$;

$A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;

each Ar is independently an arylene group;

$B_1$ to $B_3$ are independently selected from the group consisting of O, S, CO, SO, and $SO_2$;

X is a cycloalkylene or is represented by the above Formula 2;

$R_1$ to $R_{10}$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$R_{11}$, and $R_{12}$ are independently selected from the group consisting of hydrogen; fluorine; a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$Y_1$ and $Y_2$ are independently a proton conductive group;

$m_1$ to $m_{10}$ are independently selected from 0 to 10, provided that at least one of $m_1$ to $m_4$ is not 0, at least one of $m_5$ and $m_6$ is not 0, at least one of $m_7$ and $m_8$ is not 0, and at least one of $m_9$ and $m_{10}$ is not 0;

$I_1$ to $I_6$ are independently selected from 0 to 30, provided that at least one of $I_1$ and $I_2$ is not 0, at least one of $I_3$ and $I_4$ is not 0, and at least one of $I_5$ and $I_6$ is not 0;

$m_{11}$ is selected from 1 to 40;

p is in a range of 1 to 10,000;

q is in a range of 1 to 10,000; and $n_1$ to $n_8$ are independently selected from 1 to 20.

The polymer may be used for a fuel cell binder or a polymer electrolyte membrane.

According to yet another aspect of the present invention, a membrane-electrode assembly is provided that includes a cathode and an anode facing each other, each of the cathode and the anode including an electrode substrate and a catalyst layer including a catalyst and a binder; and a polymer electrolyte membrane interposed between the cathode and the anode, at least one of the binder and the polymer electrolyte membrane including a polymer represented by Formula 1.

According to still another aspect of the present invention, a fuel cell system is provided that includes at least one electricity generating element, each electricity generating element including: a membrane-electrode assembly including a cathode and an anode facing each other and a polymer electrolyte membrane interposed between the cathode and the anode, each of the cathode and the anode including an electrode substrate and a catalyst layer including a catalyst and a binder, at least one of the binder and the polymer electrolyte membrane including a polymer represented by Formula 1; and separators arranged at each side of the membrane-electrode assembly; a fuel supplier for supplying a fuel to the electricity generating element; and an oxidant supplier for supplying an oxidant to the electricity generating element.

The polymer according to an embodiment of the present invention has both hydrophobic and hydrophilic properties, and thus has improved proton conductivity, shape stability, and long-time stability.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A proton conductive polymer may include NAFION (DuPont), XUS (Dow), FELMION (Asahi Glass), ACIPLEX-S (Asahi Chemical), and NEOSEPTA (Tokuyama), which are represented by the following Formula 3.

[Chemical Formula 3]

In the above Formula 3, polytetrafluoroethylene has excellent thermal stability, chemical stability, and proton conductivity. When the polytetrafluoroethylene is grafted with perfluorovinylether through an ether group, a polymer chain is provided with flexibility by the ether bond and also with strong chemical stability by a C—F bond. In addition, the grafting structure of the perfluorovinylether into the polytetrafluoroethylene forms an ion channel on a polymer electrolyte membrane. Accordingly, NAFION, XUS, FELMION, ACIPLEX-S, and NEOSEPTA with the aforementioned structure are widely used as a polymer electrolyte membrane for a fuel cell. However, they have a severe crossover problem of a fuel such as methanol and the like, and sharply-deteriorated proton conductivity at a high temperature of 100° C. or higher.

In general, a hydrocarbon-based polymer has low permeability against a fuel such as methanol and the like, and excellent proton conductivity and high mechanical strength at a high temperature of 80° C. or higher. However, as it increasingly includes a proton conductive group, it may have problems of low shape stability due to an increased percentage of water content, low chemical stability due to easy hydrolysis of a functional group, and low radical stability due to properties of a hydrocarbon polymer.

In addition, when a common hydrocarbon-based polymer is used as a mixture with a proton conductive polymer, it may have a problem of deteriorated adherence to a catalyst layer due to low miscibility and swelling differences between the hydrocarbon-based polymer and the proton conductive polymer.

Therefore, the present invention provides a polymer with improved fuel crossover, proton conductivity at a high temperature, and dimensional stability and chemical stability.

The polymer of an embodiment of the present invention is represented by the following Formula 1.

[Chemical Formula 1]

[Chemical Formula 2]

In the above Formulae 1 and 2, $A_1$, $A_3$, $A_4$, $A_6$, $A_7$, and $A_8$ are independently selected from the group consisting of $CR_7R_8$, O, S, CO, SO, and $SO_2$. In one embodiment, $A_1$, $A_3$, $A_4$, $A_6$, $A_7$, and $A_8$ are independently selected from the group consisting of $C(CH_3)_2$, $C(CF_3)_2$, O, S, CO, and $SO_2$.

$A_2$ and $A_5$ in Formula 1 are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene. In one embodiment, $A_2$ and $A_5$ are selected from the group consisting of $CR_7R_8$, a substituted or unsubstituted fluorenylene, and a substituted or unsubstituted diphenylthioether.

Each Ar in Formulae 1 and 2 is independently an arylene group. That is, the arylene groups (Ar) in Formulae 1 and 2 are the same or different from each other.

$B_1$ to $B_3$ in Formula 1 are independently selected from the group consisting of O, S, CO, SO, and $SO_2$. In one embodiment, $B_1$ to $B_3$ are selected from the group consisting of O, S, CO, and $SO_2$.

$R_1$ to $R_{10}$ in Formulae 1 and 2 are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S. In one embodiment, $R_1$ to $R_{10}$ are independently selected from the group consisting of hydrogen, a substituted or unsubstituted alkyl, and a substituted or unsubstituted cycloalkyl.

$R_{11}$ and $R_{12}$ in Formulae 1 and 2 are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S. In one embodiment, $R_{11}$ and $R_{12}$ are independently selected from the group consisting of hydrogen, an alkyl, and fluorine.

X in Formula 1 is a cycloalkylene or is represented by the above Formula 2.

$Y_1$ and $Y_2$ in Formula 1 are independently a proton conductive group selected from the group consisting of sulfonic acid, carboxylic acid, phosphoric acid, phosphonic acid, and salts thereof. The salts of the proton conductive group include sodium salts, potassium salts, lithium salts, calcium salts, and combinations thereof. Examples of $Y_1$ to $Y_2$ are $SO_3H$, $SO_3Na$, $SO_3K$, COOH, COONa, COOK, and $P(O)(OH)_2$.

$m_1$ to $m_{10}$ are independently 0 to 10, provided that at least one of $m_1$ to $m_4$ is not 0, at least one of $m_5$ and $m_6$ is not 0, at least one of $m_7$ and $m_8$ is not 0, and at least one of $m_9$ and $m_{10}$ is not 0. In another embodiment, $m_1$ to $m_{10}$ is independently 1 to 3.

$I_1$ to $I_6$ are independently 0 to 30, provided that at least one of $I_1$ and $I_2$ is not 0, at least one of $I_3$ and $I_4$ is not 0, and at least one of $I_5$ and $I_6$ is not 0. In one embodiment, $I_1$ to $I_6$ are independently 5 to 12.

$m_{11}$ is 1 to 40. In one embodiment $m_{11}$ is 1 to 30, and in another embodiment, $m_{11}$ is 1 to 18. When $R_{11}$ and $R_{12}$ are fluorines, $m_{11}$ is 2 to 40 in one embodiment, and $m_{11}$ is 2 to 20 in another embodiment.

The p may be in a range of 1 to 10,000. In another embodiment, it may be in a range of 100 to 10,000. In still another embodiment, it may be in a range of 100 to 5,000.

The q may be in a range of 1 to 10,000. In another embodiment, it may be in a range of 10 to 10,000. According to still another embodiment, it may be in a range of 10 to 5,000 or 100 to 5,000.

$n_1$ to $n_8$ may be independently in a range of 1 to 20. In another embodiment, they may be independently in the range of 1 to 10. In still another embodiment, they may be independently in the range of 1 to 5.

Exemplary polymer may include a compound represented by the following Chemical Formulae 1a, 1b, or 1c.

[Chemical Formula 1a]

[Chemical Formula 1b]

[Chemical Formula 1c]

In the above Formulae 1a, 1b, and 1c, $A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;

X is a cycloalkylene;

$R_7$ and $R_8$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$R_{11}$ and $R_{12}$ are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$Y_1$ and $Y_2$ are independently selected from the group consisting of a proton conductive group;

$m_{11}$ is 1 to 40, in one embodiment, $m_{11}$ is 1 to 30, and in another embodiment, $m_{11}$ is 1 to 18;

p is 1 to 10,000, and in one embodiment, p is 100 to 10,000; and q is 1 to 10,000, and in one embodiment q is 10 to 10,000.

In the present specification, the term "substituted" refers to one substituted with at least one substituent selected from the group consisting of a halogen (e.g., F, Cl, Br, or I), an alkyl, a cycloalkyl, an alkenyl, an alkoxy, an aryl, a heteroaryl, and a heteroalkyl including an atom selected from the group consisting of O, N, and S.

In the present specification, a hetero compound refers to a compound including 1 to 3 heteroatoms selected from the group consisting of nitrogen (N), oxygen (O), sulfur (S), and phosphorus (P).

Unless otherwise specified, when it is described in the specification and the claims that A and B "are independently selected", it means that A and B may be the same or different from each other.

Unless there is any particular comment in the specification, "an alkylene" may include $C_1$ to $C_{24}$. "A cycloalkylene" may include $C_4$ to $C_8$. "An alkyl" may include $C_1$ to $C_{12}$. "A cycloalkyl" may include $C_4$ to $C_8$. "An alkenyl" may include $C_2$ to $C_{12}$. "An alkoxy" may include $C_1$ to $C_{12}$. "An aryl" may include $C_6$ to $C_{24}$. "A heteroaryl" may include $C_2$ to $C_{11}$. "A heteroalkyl" may include $C_1$ to $C_{12}$.

For example, in one embodiment, alkylene may include $C_6$ to $C_{10}$. Cycloalkylene may include $C_5$ to $C_6$ in one embodiment. Alkyl may include $C_1$ to $C_5$ in one embodiment. Cycloalkyl may include $C_5$ to $C_6$ in one embodiment. Alkenyl may include $C_2$ to $C_3$ in one embodiment. Alkoxy may include $C_1$ to $C_6$ in one embodiment. Aryl may include $C_6$ to $C_{12}$ in one embodiment. Heteroaryl may include $C_2$ to $C_5$ in one embodiment. Heteroalkyl may include $C_1$ to $C_5$ in one embodiment.

A polymer represented by the above Formula 1 includes a hydrophobic part (I) and a hydrophilic part (II).

[Chemical Formula 1]

The hydrophobic part (I) in the above Formula 1 includes an alkylene or cycloalkylene. The alkylene or cycloalkylene has excellent water-resistance and thereby a low percentage of water content. Accordingly, it may have high shape stability against moisture. In addition, the alkylene or cycloalkylene has excellent resistance against a fuel and thereby low permeability against a fuel such as methanol and the like. On the other hand, the hydrophilic part (II) in the above Formula 1 includes a proton conductive group, and thereby has high proton conductivity.

Since the hydrophobic part (I) including an alkylene or cycloalkylene in the above Formula 1 is not mixed with the hydrophilic part, it may have excellent phase separation behavior. Accordingly, even if the alkylene include many carbons, the polymer represented by above Formula 1 may have high shape stability and proton conductivity. In addition, a polymer including the alkylene may have excellent membrane properties, since they may be crystallized with one another.

Unless otherwise specified, the polymer by the above Formula 1 having two constitutional units of the hydrophobic part (I) and the hydrophilic part (II) may include an alternating copolymer, a periodic copolymer, a random copolymer, and a block copolymer.

According to one embodiment of the present invention, a polymer of the above Formula 1 may have a weight average molecular weight ranging from 1,000 to 1,000,000. In another embodiment, it may have a weight average molecular weight ranging from 20,000 to 500,000. When the polymer has a weight average molecular weight within the above range, it may have excellent proton conductivity and shape stability. It may also have high proton conductivity at a low humidifying condition and excellent mechanical properties, and may prevent cross-over of a fuel.

The polymer of the above Formula 1 may be prepared through condensation polymerization of monomers having the following Chemical Formulae a, b, and c, but may be prepared in various other methods.

[Chemical Formula a]

[Chemical Formula b]

[Chemical Formula c]

Herein, each substituent in the above Chemical Formulas a, b, and c is the same as defined in Chemical Formula 1.

In addition, a polymer of the above Formula 1 may be used as a binder for a fuel cell or a polymer electrolyte membrane for a fuel cell.

For example, a polymer electrolyte membrane may be prepared by dissolving a polymer of Formula 1 in an organic solvent into a solution, and making a film with this solution. Herein, the organic solvent may include N-methylpyrrolidone, methylacetate, methylfluoride, and the like. The process of making a film with the solution is well-known in this related art and is not illustrated in detail here. In addition, a polymer electrolyte membrane may be prepared by various common methods of using a polymer of Chemical Formula 1 other than the aforementioned one.

According to still another embodiment of the present invention, provided is a membrane-electrode assembly for a fuel cell including a polymer of the above Formula 1 as a polymer electrolyte membrane. The membrane-electrode assembly includes an anode and a cathode facing each other, and a polymer electrolyte membrane positioned between them.

The polymer electrolyte membrane is the same as aforementioned. The anode and cathode include an electrode substrate and a catalyst layer.

The catalyst layer may include a catalyst and additionally a binder to improve adherence of the catalyst to an electrode or among catalyst particles, and also to improve proton conductivity.

When the binder includes a polymer of the above Formula 1, it may have improved affinity to a polymer electrolyte membrane.

In addition, the binder may include a polymer of Chemical Formula 1 and a binder resin commonly used in a fuel cell. Herein, a polymer of the above Formula 1 and a common binder resin may be mixed in a weight ratio of 0.1:9.9 to 9.9:0.1. In another embodiment, they may be mixed in a weight ratio of 3:7 to 7:3. When the binder is included within the range, it may improve interface adherence of an electrode layer including the binder to a polymer electrolyte membrane.

The binder resin may be a proton conductive polymer resin having a cation exchange group selected from the group consisting of a sulfonic acid group, a carboxylic acid group, a phosphoric acid group, a phosphonic acid group, and derivatives thereof at its side chain. Non-limiting examples of the polymer include at is least one proton conductive polymer selected from the group consisting of perfluoro-based polymers, benzimidazole-based polymers, polyimide-based polymers, polyetherimide-based polymers, polyphenylene-sulfide-based polymers, polysulfone-based polymers, polyethersulfone-based polymers, polyetherketone-based polymers, polyether-etherketone-based polymers, and polyphenylquinoxaline-based polymers. In an embodiment, the proton conductive polymer is at least one selected from the group consisting of poly(perfluorosulfonic acid), poly (perfluorocarboxylic acid), a copolymer of tetrafluoroethylene and fluorovinylether having a sulfonic acid group, a defluorinated polyetherketone sulfide, an aryl ketone, poly(2, 2'-(m-phenylene)-5,5'-bibenzimidazole), or poly(2,5-benzimidazole).

The binder resins may be used singularly or in combination. They may be used along with non-conductive materials to improve adherence with a polymer electrolyte membrane. The binder resins may be used in a controlled amount to adapt to their purposes.

Non-limiting examples of the non-conductive materials include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, or combinations thereof.

The catalyst may be any catalyst that may perform a fuel cell reaction. The catalyst may representatively include a platinum-based catalyst. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. The anode and the cathode may include the same catalyst. However, in a fuel cell, since an anode catalyst may be poisoned by CO, CO-tolerant platinum-ruthenium alloy catalysts may be suitably used as an anode catalyst. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W. Such a metal catalyst may be used in a form of a metal itself (black catalyst), or one supported on a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon may be generally used. When the catalyst includes a noble metal supported on a carrier, it may include any one available in the market or one prepared by carrying a noble metal on a carrier. The process for supporting a noble metal on a carrier is well known to those skilled in the art, and so the details will be omitted from this detailed description.

The electrode substrate supports the electrode, and provides a path for transferring fuel and oxidant to the catalyst layer. In one embodiment, the electrode substrates are formed from a material such as carbon paper, carbon cloth, carbon felt, or a metal cloth (a porous film composed of metal fiber or a metal film disposed on a surface of a cloth composed of polymer fibers). The electrode substrates are not limited thereto.

The electrode substrates may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride, alkoxyvinyl ether, fluorinated ethylene propylene, polychlorotrifluoro ethylene, or copolymers thereof, but is not limited thereto.

A microporous layer (MPL) may be added between the aforementioned electrode substrate and catalyst layer to increase reactant diffusion effects. The microporous layer generally includes conductive material, for example, conductive powders with a certain particle diameter. The conductive material may include, but is not limited to, carbon powder, carbon black, acetylene black, ketjen black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin may include, but is not limited to, polytetrafluoroethylene, polyvinylidenefluoride, polyhexafluoropropylene, polyperfluoroalkylvinylether, polyperfluorosulfonylfluoride, alkoxyvinyl ether, polyvinylalcohol, cellulose acetate, or copolymers thereof.

The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, or tetrahydrofuran. The coating method may include, but is not limited to, screen printing, spray coating, doctor blade methods, and so on, depending on the viscosity of the composition.

According to another embodiment of the present invention, a fuel cell system including the membrane-electrode assembly is provided. The fuel cell system includes at least one electricity generating element, a fuel supplier, and an oxidant supplier.

The electricity generating element includes a membrane-electrode assembly and a separator (also referred to as a bipolar plate). The membrane-electrode assembly includes a polymer electrolyte membrane, and a cathode and an anode disposed at opposite sides of the polymer electrolyte membrane. The electricity generating element generates electricity through oxidation of a fuel and reduction of an oxidant.

The fuel supplier plays a role of supplying the electricity generating element with a fuel. The oxidant supplier plays a role of supplying the electricity generating element with an oxidant such as oxygen or air.

The fuel includes liquid or gaseous hydrogen, or a hydrocarbon-based fuel such as methanol, ethanol, propanol, butanol, or natural gas.

Figure 1:
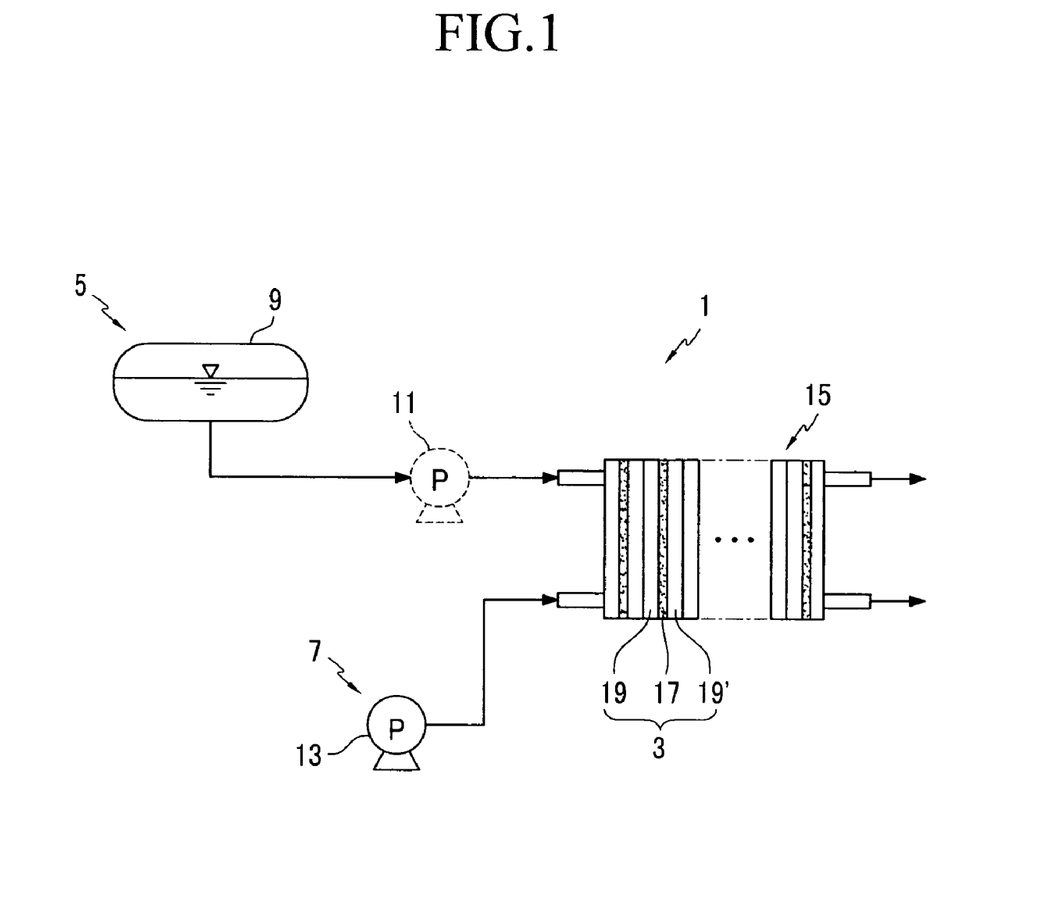
FIG. 1 is a schematic view of a fuel cell system according to the present invention.

A schematic structure of an exemplary fuel cell system will be described in detail with reference to FIG. 1 as follows. FIG. 1 illustrates a fuel cell system wherein a fuel and an oxidant are provided to the electricity generating element through pumps, but the present invention is not limited to such structures. The fuel cell system of an embodiment of the present invention alternatively includes a structure wherein a fuel and an oxidant are provided in a diffusion manner.

A fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9 that stores fuel, and a fuel pump 11 that is connected therewith. The fuel pump 11 supplies fuel stored in the tank 9 with a predetermined pumping power.

The oxidant supplier 7 is equipped with at least one pump 13 for supplying an oxidant with a predetermined pumping power.

The electricity generating element 3 includes a membrane-electrode assembly 17 that oxidizes hydrogen or a fuel and reduces an oxidant, and separators 19 and 19' that are respectively positioned at opposite sides of the membrane-electrode assembly and supply hydrogen or a fuel, and an oxidant to the membrane-electrode assembly. At least one electricity generating element 3 is composed in a stack 15.

The following examples illustrate the present invention in more detail. However, it is understood that the present invention is not limited by these examples.

EXAMPLE 1

[Chemical Formula 1-1]

[Chemical Formula 1-1a]

In the chemical Formulae 1-1 and 1-1a, p and q are determined according to a mole ratio of the starting materials.

6.13 g of bisphenol A (BPA) was mixed with 8.12 g of 1,10-bis[(4-fluorobenzoyl)phenoxy]decane), 5.33 g of disulfonated difluorophenyl ketone, and 4.82 g of potassium carbonate. The mixture was put in a 500 ml 4-neck round bottom flask equipped with a thermometer, an in-let for $N_2$ gas, and a Dean-Stark outlet. Then, 100 ml of N-methylpyrrolidone and 5 ml of toluene were added thereto as a solvent and agitated at 140° C. for 4 hours. Next, toluene was distilled from the reaction solution and then agitated for polymerization at 170° C. for 24 hours.

When the reaction was complete, the reaction product was cooled to 60° C. and then precipitated in an excess amount of methanol. Then, a polymer was filtrated from the acquired product, then washed with an excessive amount of water and dried in an oven, preparing a random copolymer represented by the above Formula 1-1.

The polymer represented by the above Formula 1-1 was dissolved in a dimethylacetamide organic solvent. The solution was cast and then vacuum-dried, preparing a polymer membrane. The prepared polymer membrane was immersed in a 1 M sulfuric acid solution for 2 days, preparing a polymer electrolyte membrane including the random copolymer represented by the above Formula 1-1a.

A viscosity of the copolymer of the above Formula 1-1a was measured to evaluate a weight average molecular weight of the polymer using a method disclosed in Macromol. Chem. Phys. 199, 1421-1426 (1998). The measured viscosity was 2.0 g/dl.

Next, a composition for a cathode catalyst was prepared by mixing a Pt black catalyst (Johnson Matthey) and NAFION/$H_2O$/2-propanol (Solution Technology Inc.) in a 5 wt % concentration in a weight ratio of 88:12 and coated on a cathode substrate to prepare a cathode.

In addition, an anode was prepared by mixing a Pt-Ru black catalyst (Johnson Matthey) and NAFION/$H_2O$/2-propanol (Solution Technology Inc.) in a 5 wt % concentration in a weight ratio of 88:12 to prepare a composition for an anode catalyst, and coating it on a carbon paper substrate (SGL GDL 10DA).

Herein, the anode and cathode were loaded with the catalysts in an amount of 4 mg/cm$^2$.

Then, the anode, the cathode, and the polymer electrolyte membrane were used to fabricate a unit cell.

EXAMPLE 2

[Chemical Formula 1-2a]

In the chemical Formula 1-2a, p and q are determined according to a mole ratio of the starting materials.

A unit cell was fabricated to include a polymer electrolyte membrane according to the same method as Example 1, except for including 4,4-(hexafluoroisopropylidene)diphenol (6F-BPA) instead of bisphenol A (BPA). Herein, the polymer electrolyte membrane included a random copolymer represented by the above Formula 1-2a.

A viscosity of the copolymer of the above Formula 1-2a was measured to evaluate a weight average molecular weight of the polymer using a method disclosed in Macromol. Chem. Phys. 199, 1421-1426 (1998). The measured viscosity was 1.6 g/dl.

EXAMPLE 3

[Chemical Formula 1-3a]

In the chemical Formula 1-3a, p and q are determined according to a mole ratio of the starting materials.

A unit cell was fabricated to include a polymer electrolyte membrane according to the same method as Example 1, except for including fluorene instead of bisphenol A (BPA). Herein, the polymer electrolyte membrane included a random copolymer represented by the above Formula 1-3a.

A viscosity of the copolymer of the above Formula 1-3a was measured to evaluate a weight average molecular weight of the polymer using a method disclosed in Macromol. Chem. Phys. 199, 1421-1426 (1998). The measured viscosity was 2.2 g/dl.

EXAMPLE 4

[Chemical Formula 1-4]

[Chemical Formula 1-4a]

In the chemical Formulae 1-4 and 1-4a, p and q are determined according to a mole ratio of the starting materials.

A polymer electrolyte membrane including the random copolymer represented by the above Formula 1-4a was prepared according to the same method as in Example 1, except for including 1,6-bis(4-fluorobenzoyl)cyclohexane instead of 1,1 0-bis[(4-fluorobenzoyl)phenoxy]decane.

In addition, a binder represented by the above Formula 1-4a was prepared by dipping a polymer represented by the above Formula 1-4 in 1 M of a sulfuric acid solution for 2 days.

The polymer electrolyte membrane including the copolymer represented by Chemical Formula 1-4a and the binder represented by Chemical Formula 1-4a were used to prepare a unit cell.

A viscosity of the copolymer of the above Formula 1-4a was measured to evaluate a weight average molecular weight of the polymer using a method disclosed in Macromol. Chem. Phys. 199, 1421-1426 (1998). The measured viscosity was 1.5 g/dl.

EXAMPLE 5 including 1,4-bis(4-fluorobenzoyl)perfluorobutane instead of 1,10-bis[(4-fluorobenzoyl)phenoxy]decane.

In addition, a binder represented by the above Formula 1-5a was prepared by dipping a polymer represented by the above Formula 1-5 in a 1 M sulfuric acid solution for 2 days.

The polymer electrolyte membrane including a random copolymer represented by Chemical Formula 1-5a and the binder represented by Chemical Formula 1-5a were used to fabricate a unit cell.

A viscosity of the copolymer of the above Formula 1-5a was measured to evaluate a weight average molecular weight of the polymer using a method disclosed in Macromol. Chem. Phys. 199, 1421-1426 (1998). The measured viscosity was 1.9 g/dl.

EXAMPLES 6 TO 10

Unit cells according to Examples 6 to 10 were fabricated according to the same method as Examples 1 to 5, except for respectively loading anode and cathode catalysts in an amount of 5 mg/cm$^2$.

[Chemical Formula 1-5]

[Chemical Formula 1-5a]

In the chemical Formulae 1-5 and 1-5a, p and q are determined according to a mole ratio of the starting materials.

A polymer electrolyte membrane including the random copolymer represented by the above Formula 1-5a was prepared according to the same method as Example 1, except for

COMPARATIVE EXAMPLE 1

A unit cell was fabricated according to the same method as Example 1, except for using a Nafion 115 (perfluorosulfonic acid) polymer electrolyte membrane.

COMPARATIVE EXAMPLE 2

[Chemical Formulas 1-6]

In the chemical Formula 1-6, n and m are determined according to a mole ratio of the starting materials.

A unit cell was fabricated to include a polymer electrolyte membrane prepared by a random copolymer represented by the above Formula 1-6 according to the same method as Example 1, except for using 4,4-difluorobenzophenone instead of 1,10-bis[(4-flurobenzoyl)phenoxy]decane.

A viscosity of the copolymer of the above Formula 1-6 was measured to evaluate a weight average molecular weight of the polymer using a method disclosed in Macromol. Chem. Phys. 199, 1421-1426 (1998). The measured viscosity was 1.4 g/dl.

Measurement of Ion Exchange Capacity (IEC), Ion Conductivity, Fuel Permeability, Swelling, and Power Density The unit cells according to Examples 1 to 3 and 5 and Comparative Examples 1 and 2 were measured regarding ion exchange capacity (IEC) using a method disclosed in Macromol. Chem. Phys. 199, 1421-1426 (1998), ion conductivity using a method disclosed in Ind. Eng. Chem. Res. 2005, 44, 7617-7626, MeOH permeability using a method disclosed in Journal of Membrane Science 335 (2009) 13-20, swelling when MeOH at an 8M concentration was injected at 80° C., thickness change with respect to initial thickness using a method disclosed in Macromol. Chem. Phys. 199, 1421-1426 (1998), and power density at 0.4V using a method disclosed in Journal of Power Source (2007), 167, 74-78. The results of Examples 1 to 3, Example 5, and Comparative Examples 1 and 2 are shown in Table 1.

In addition, the unit cells of Example 6 were measured regarding current/voltage characteristics and power density, while MeOH at a 1M concentration was injected at 70° C. Each result of Example 6 is respectively shown in FIGS. 2 and 3.

TABLE 1

| | IEC (meq./g) | Ion conductivity (S/cm) | MeOH permeability ($10^{-7}$ cm$^2$/sec.) | Swelling (%) | Power density (mW/cm$^2$) |
|---|---|---|---|---|---|
| Example 1 | 1.56 | 0.12 | 2.13 | 15 | 120 |
| Example 2 | 1.45 | 0.06 | 1.94 | 12 | 110 |
| Example 3 | 1.47 | 0.06 | 1.62 | 10 | 120 |
| Example 5 | 1.5 | 0.07 | 10 | 30 | 120 |
| Comparative Example 1 | 1.0 | 0.1 | 20 | 70 | 100 |
| Comparative Example 2 | 1.4 | 0.04 | 9 | 50 | 70 |

Referring to Table 1, the unit cells of Examples 1 to 3 and Example 5 were found to have excellent ion exchange capacity, ion conductivity, and power density, and also superbly-improved methanol permeability and swelling characteristics.

On the contrary, the unit cell of Comparative Example 1 had equivalent ion conductivity to those of Examples 1 to 3 and Example 5, but low ion exchange capacity and power density. Further, it had severely deteriorated MeOH permeability and swelling characteristics. In addition, the unit cell of Comparative Example 2 had equivalent ion exchange capacity and methanol permeability to those of Examples 1 to 3 and Example 5 but low ion conductivity and power density, and in particular, severely swelling.

Figure 2:
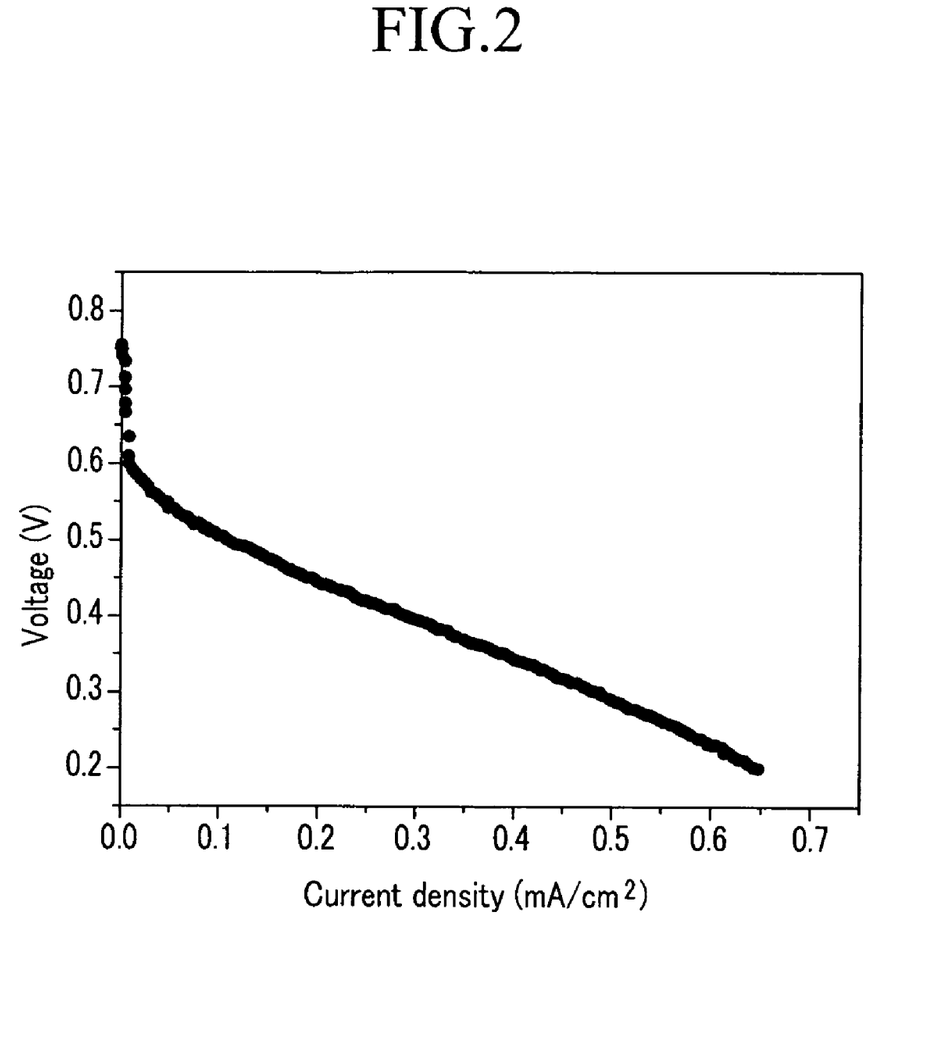
FIG. 2 shows current/voltage characteristics of the unit cell according to Example 6.
Figure 3:
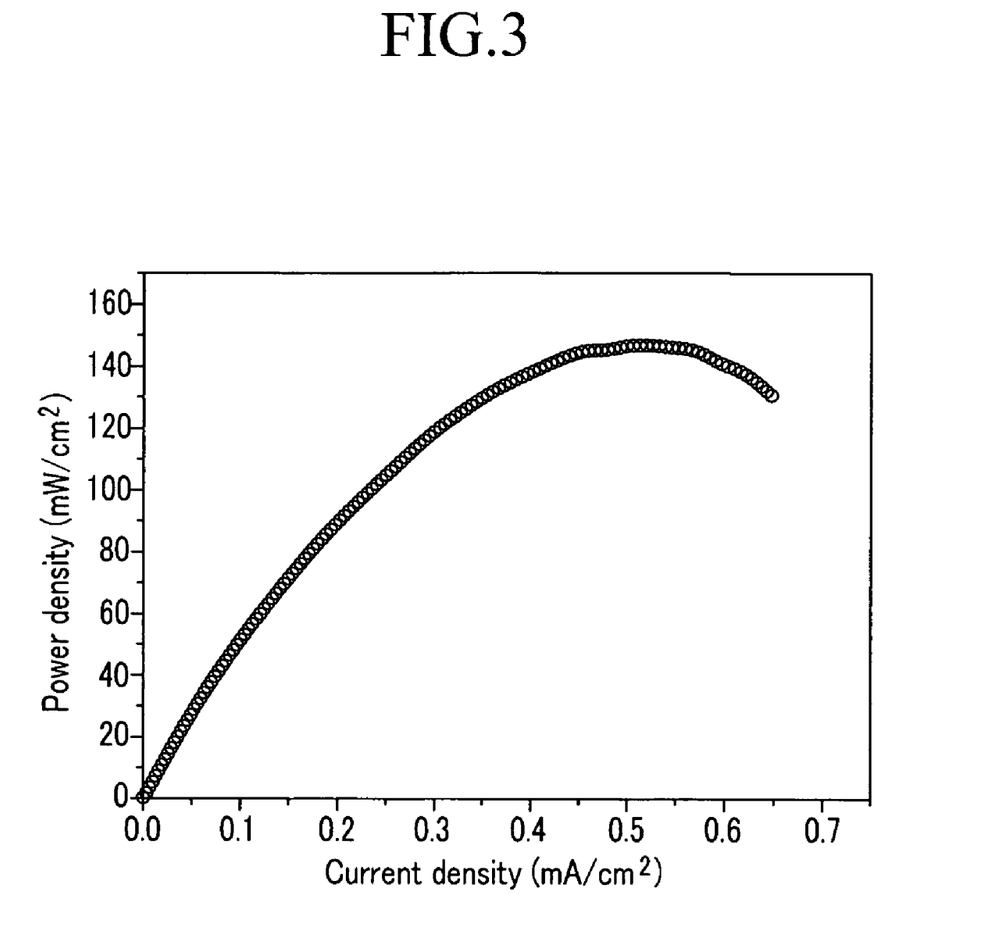
FIG. 3 shows output density of a unit cell according to Example 6.

Referring to FIG. 2, the unit cell of Example 6 had excellent current/voltage characteristics. Referring to FIG. 3, it also had excellent power density.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer represented by Formula 1:

[Formula 1]

where X is a cycloalkylene or is represented by Formula 2:

[Formula 2]

$A_1$, $A_3$, $A_4$, $A_6$, $A_7$ and $A_8$ are independently selected from the group consisting of $CR_7R_8$, O, S, CO, SO, and $SO_2$;

$A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;

each Ar is independently an arylene group;

$B_1$ to $B_3$ are independently selected from the group consisting of O, S, CO, SO, and $SO_2$;

3. The polymer of claim 1, wherein the proton groups of $Y_1$ and $Y_2$ are independently selected from the group consisting of sulfonic acid, carboxylic acid, phosphoric acid, phosphonic acid, and salts thereof.

4. The polymer of claim 3, wherein the salts are selected from the group consisting of a sodium salt, a potassium salt, a lithium salt, a calcium salt, and combinations thereof.

5. The polymer of claim 1, represented by one of Formulae 1a, 1b, or 1c:

$R_1$ to $R_{10}$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$R_{11}$ and $R_{12}$ are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$Y_1$ and $Y_2$ are independently a proton conductive group;

$m_1$ to $m_{10}$ are independently 0 to 10, provided that at least one of $m_1$ to $m_4$ is not 0, at least one of $m_5$ and $m_6$ is not 0, at least one of $m_7$ and $m_8$ is not 0, and at least one of $m_9$ and $m_{10}$ is not 0;

$l_1$ to $l_6$ are independently 0 to 30, provided that at least one of $l_1$ and $l_2$ is not 0, at least one of $l_3$ and $l_4$ is not 0, and at least one of $l_5$ and $l_6$ is not 0;

$m_{11}$ is 1 to 40;

p is 1 to 10,000;

q is 1 to 10,000; and $n_1$ to $n_8$ are independently 1 to 20.

2. The polymer of claim 1, wherein $m_1$ to $m_{10}$ are independently 1 to 3, $l_1$ to $l_6$ are independently 5 to 12, and $m_{11}$ is 1 to 18.

wherein, in Formulae 1a, 1b, and 1c, $A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;

X is a cycloalkylene;

$R_7$ and $R_8$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$R_{11}$ and $R_{12}$ are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$Y_1$ and $Y_2$ are independently selected from the group consisting of a proton conductive group;

$m_{11}$ is 1 to 40;

p is 1 to 10,000; and q is 1 to 10,000.

6. The polymer of claim 5, represented by Formula 1a.

7. The polymer of claim 5, represented by Formula 1b.

8. The polymer of claim 5, represented by Formula 1c.

9. A fuel cell having a polymer electrolyte membrane comprised of the polymer of claim 1.

10. A fuel cell having a catalyst layer including a binder comprised of the polymer of claim 1.

11. A membrane-electrode assembly for a fuel cell, comprising:
a cathode and an anode facing each other, each of the cathode and the anode comprising an electrode substrate and a catalyst layer comprised of a catalyst and a binder; and
a polymer electrolyte membrane interposed between the cathode and the anode, at least one of the binder and the polymer electrolyte membrane comprising a polymer represented by Formula 1:

stituted heteroalkyl including an atom selected from the group consisting of O, N, and S;
$R_{11}$ and $R_{12}$ are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;
$Y_1$ and $Y_2$ are independently a proton conductive group;
$m_1$ to $m_{10}$ are independently 0 to 10, provided that at least one of $m_1$ to $m_4$ is not 0, at least one of $m_5$ and $m_6$ is not 0, at least one of $m_7$ and $m_8$ is not 0, and at least one of $m_9$ and $m_{10}$ is not 0;

[Formula 1]

Wherein X is a cycloalkylene or is represented by Formula 2:

[Formula 2]

$A_1, A_3, A_4, A_6, A_7$, and $A_8$ are independently selected from the group consisting of $CR_7R_8$, O, S, CO, SO, and $SO_2$;
$A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;
each Ar is independently an arylene group;
$B_1$ to $B_3$ are independently selected from the group consisting of O, S, CO, SO, and $SO_2$;
$R_1$ to $R_{10}$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsub- $l_1$ to $l_6$ are independently 0 to 30, provided that at least one of $l_1$ and $l_2$ is not 0, at least one of $l_3$ and $l_4$ is not 0, and at least one of $l_5$ and $l_6$ is not 0;
$m_{11}$ is 1 to 40;
p is 1 to 10,000;
q is 1 to 10,000; and
$n_1$ to $n_8$ are independently 1 to 20.

12. The membrane-electrode assembly of claim 11, wherein the binder comprises the polymer represented by Formula 1.

13. The membrane-electrode assembly of claim 11, wherein the polymer electrolyte membrane comprises the polymer represented by Formula 1.

14. The membrane-electrode assembly of claim 11, wherein $m_1$ to $m_{10}$ are independently 1 to 3, $l_1$ to $l_6$ are independently 5 to 12, and $m_{11}$ is 1 to 18.

15. The membrane-electrode assembly of claim 11, wherein $Y_1$ and $Y_2$ are independently selected from the group consisting of sulfonic acid, carboxylic acid, phosphoric acid, phosphonic acid, and salts thereof.

16. The membrane-electrode assembly of claim 11, wherein the polymer is represented by one of Formulae 1a, 1b, or 1c:

[Formula 1a]

[Formula 1b]

[Formula 1c]

wherein, in Formulae 1a, 1b, and 1c, $A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;

X is a cycloalkylene;

$R_7$ and $R_8$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$R_{11}$ and $R_{12}$ are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$Y_1$ and $Y_2$ are independently selected from the group consisting of a proton conductive group;

$m_{11}$ is 1 to 40;

p is 1 to 10,000; and q is 1 to 10,000.

17. A fuel cell system comprising:
at least one electricity generating element, each electricity generating element comprising:
a membrane-electrode assembly comprising a cathode and an anode facing each other and a polymer electrolyte membrane interposed between the cathode and the anode, each of the cathode and the anode comprising an electrode substrate and a catalyst layer comprised of a catalyst and a binder, at least one of the binder and the polymer electrolyte membrane comprising a polymer represented by Formula 1; and
separators arranged at each side of the membrane-electrode assembly;
a fuel supplier for supplying a fuel to the electricity generating element; and
an oxidant supplier for supplying an oxidant to the electricity generating element:

Where X is a cycloalkylene or is represented by Formula 2:

[Formula 2]

$A_1, A_3, A_4, A_6, A_7$, and $A_8$ are independently selected from the group consisting of $CR_7R_8$, O, S, CO, SO, and $SO_2$;

$A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;

each Ar is independently an arylene group;

$B_1$ to $B_3$ are independently selected from the group consisting of O, S, CO, SO, and $SO_2$;

$R_1$ to $R_{10}$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$R_{11}$ and $R_{12}$ are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$Y_1$ and $Y_2$ are independently a proton conductive group;

$m_1$ to $m_{10}$ are independently 0 to 10, provided that at least one of $m_1$ to $m_4$ is not 0, at least one of $m_5$ and $m_6$ is not 0, at least one of $m_7$ and $m_8$ is not 0, and at least one of $m_9$ and $m_{10}$ is not 0;

$l_1$ to $l_6$ are independently 0 to 30, provided that at least one of $l_1$ and $l_2$ is not 0, at least one of $l_3$ and $l_4$ is not 0, and at least one of $l_5$ and $l_6$ is not 0;

$m_{11}$ is 1 to 40;

[Formula 1]

p is 1 to 10,000;
q is 1 to 10,000; and
$n_1$ to $n_8$ are independently 1 to 20.

18. The fuel cell system of claim 17, wherein $m_{11}$ is 1 to 30.

19. The fuel cell system of claim 17, wherein the polymer is represented by one of Formulae 1a, 1b, or 1c:

wherein, in Formulae 1a, 1b, and 1c, $A_2$ and $A_5$ are independently selected from the group consisting of $CR_7R_8$, a substituted or unsubstituted alkylene, a substituted or unsubstituted cycloalkylene, a substituted or unsubstituted fluorenylene, and a substituted or unsubstituted arylene;

X is a cycloalkylene;

$R_7$ and $R_8$ are independently selected from the group consisting of hydrogen, a substituted or unsubstituted alkyl, a substituted or unsubstituted cycloalkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$R_{11}$ and $R_{12}$ are independently selected from the group consisting of hydrogen, fluorine, a substituted or unsubstituted alkyl, a substituted or unsubstituted alkenyl, a substituted or unsubstituted alkoxy, a substituted or unsubstituted aryl, a substituted or unsubstituted heteroaryl, and a substituted or unsubstituted heteroalkyl including an atom selected from the group consisting of O, N, and S;

$Y_1$ and $Y_2$ are independently selected from the group consisting of a proton conductive group;

$m_{11}$ is 1 to 40;

p is 1 to 10,000; and q is 1 to 10,000.

* * * * *